United States Patent [19]
Wu

[11] Patent Number: 5,577,130
[45] Date of Patent: Nov. 19, 1996

[54] METHOD AND APPARATUS FOR DETERMINING THE DISTANCE BETWEEN AN IMAGE AND AN OBJECT

[75] Inventor: Hsiang-Lung Wu, Yorktown Heights, N.Y.

[73] Assignee: Philips Electronics North America, New York, N.Y.

[21] Appl. No.: 740,279

[22] Filed: Aug. 5, 1991

[51] Int. Cl.[6] .................................................. G06K 9/00
[52] U.S. Cl. ........................ 382/106; 382/153; 382/154
[58] Field of Search .................................. 382/1, 45, 48, 382/106, 153, 154, 291; 358/88, 105, 107; 356/12; 359/462; 364/561; 348/135, 139, 142

[56] References Cited

U.S. PATENT DOCUMENTS

| | | | |
|---|---|---|---|
| 4,146,924 | 3/1979 | Birk et al. | 364/513 |
| 4,601,053 | 7/1986 | Grumet | 382/1 |
| 4,611,292 | 9/1986 | Ninomiya et al. | 364/559 |
| 4,754,327 | 6/1988 | Lippert | 358/88 |
| 4,837,616 | 6/1989 | Kasano et al. | 358/107 |
| 4,839,824 | 6/1989 | Ando | 364/516 |
| 5,023,712 | 6/1991 | Kajiwara | 358/105 |
| 5,034,986 | 7/1991 | Karmann et al. | 382/1 |
| 5,139,327 | 8/1992 | Tanaka | 356/1 |

FOREIGN PATENT DOCUMENTS

| | | | |
|---|---|---|---|
| 0390051 | 10/1990 | European Pat. Off. | 358/105 |

OTHER PUBLICATIONS

"Stochastic Stereo Matching Over Scale", by Stephen T. Barnard, "International Journal of Computer Vision", No. 13 (1), 1989, pp. 17–32.

"Structure from Stereo–A Review", by Umesh R. Dhond and J. K. Aggarwal, IEEE Transactions on Systems, Man, and Cybernetics, vol. 19, No. 6, Nov./Dec., 1989, pp. 1489–1510.

"Insects Help With The Problem of Artificial Human Vision", by Liz Glasgow, Canberra, New Scientist, 4 Nov. 1989, p. 38.

"Generalizing Epipolar–Plane Image Analysis on the Spatiotemporal Surface", by H. Harlyn Baker and Robert C. Bolles, International Journal of Computer Vision, 3.33–49 (1989).

*Primary Examiner*—Leo Boudreau
*Assistant Examiner*—Andrew W. Johns
*Attorney, Agent, or Firm*—Debra K. Stephens

[57] ABSTRACT

A video camera is displaced to successive positions a displacement distance that differs from each preceding position by a factor of two wherein the camera image plane is at a constant distance from an object whose distance from the camera is to be estimated. The further that the camera is moved the more accurate the estimated distance. The camera is displaced a relatively small increment initially to provide an accurate estimate of the corresponding pixel of interest in the next camera position. The successive displacements increase rapidly to relatively large values, to which the estimated pixel disparity corresponds to give a relatively accurate camera to object distance estimate. The window size and position of each successive camera position for each pixel of the image can be accurately estimated to reduce potential error in pixel disparity estimation.

17 Claims, 6 Drawing Sheets

FIG. 3
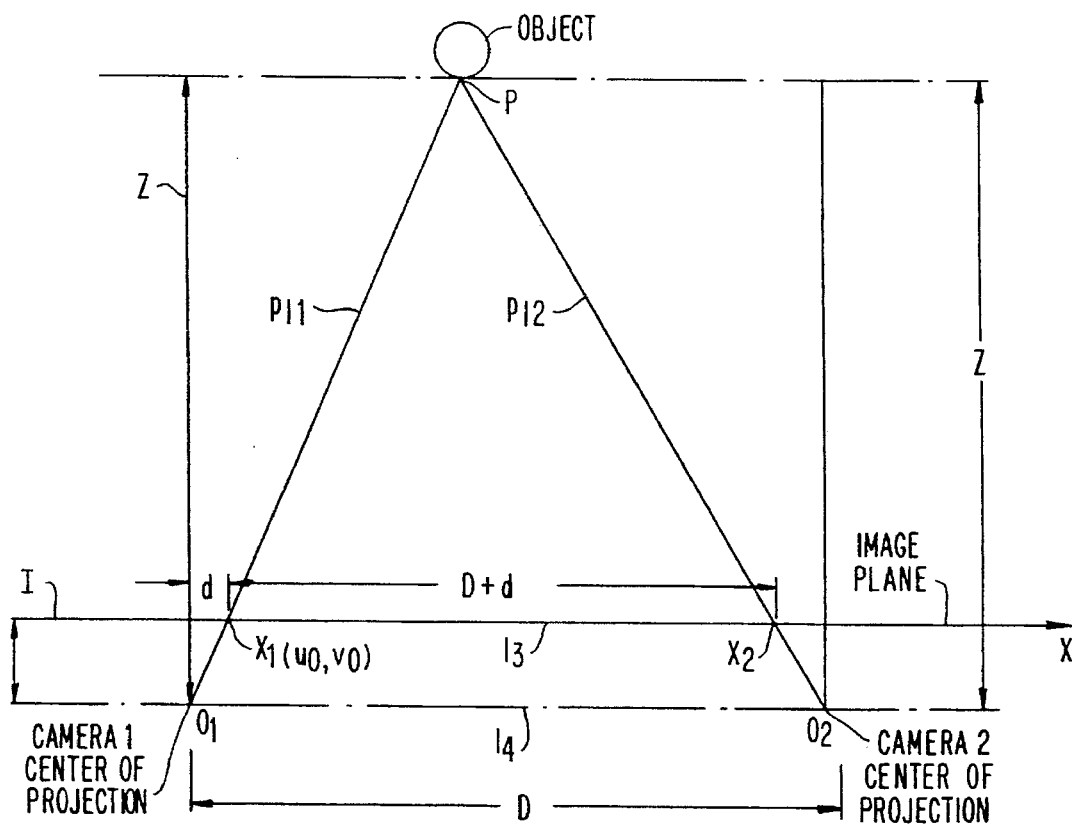
FIG. 4a
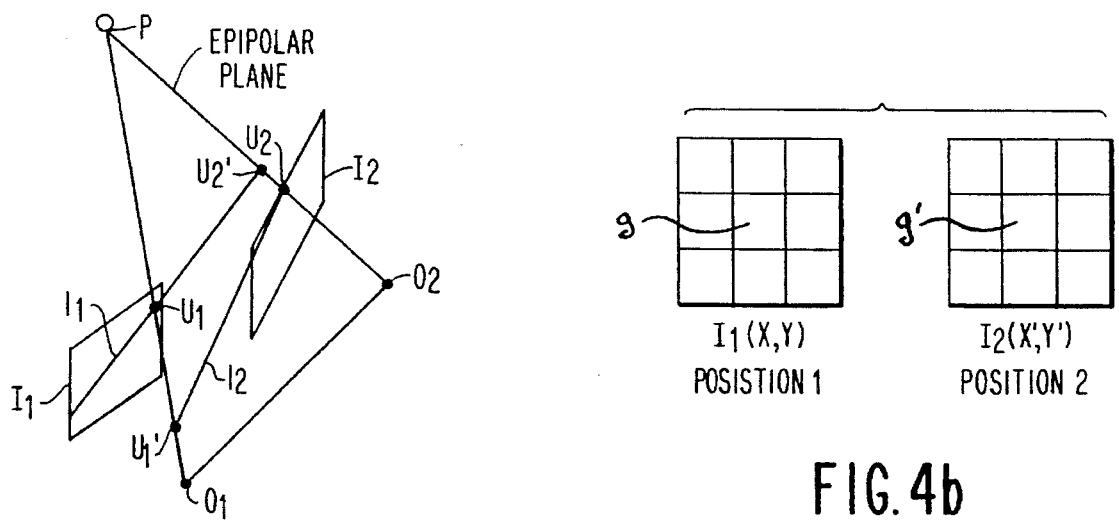
FIG. 4b

METHOD AND APPARATUS FOR DETERMINING THE DISTANCE BETWEEN AN IMAGE AND AN OBJECT

BACKGROUND OF THE INVENTION

1. Field of the Invention

The present invention relates to a method and apparatus employing stereo vision methodology for determining depth information between an object and an image.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Stereo vision, is widely used in computer vision for determining the distance between an object and an image plane. In stereo vision images as seen by two eyes are slightly different due to binocular parallax. An object point produces associated image points in the two images seen by the eyes. When the two images are overlayed, there is a given finite distance between the two pixels corresponding to the same object point. The distance between these two pixels is called disparity. The disparity varies over the visual field and is inversely proportional to the distance (depth) between the object point and the observer, i.e., the image plane. It is known that the distance between the image plane and the object point can be determined from the disparity.

A significant problem in determining that distance is the accurate determination of the disparity. The difficulty in finding a pair of pixels in two images corresponding to the same object point is referred to as the correspondence problem in stereo vision. The process of finding such pairs of points for determining disparity is referred to as stereo matching.

Most stereo vision algorithms in the literature disclose recovering depth information utilizing two or three images, i.e., binocular or trinocular stereo, respectively. The algorithms compute depth information between an image plane and an object point in a noise insensitive manner. Image resolution causes problems in computing the depth values accurately because the measure of the disparity that corresponds to the image of an object point is quantized to an integer. Quantization can be viewed as adding an error to the measure of disparity. Accurate disparity measurement is crucial for computing depth information accurately. Various methodologies solving this problem use what is referred to as relaxation methods to smooth constraints on disparity fields and optimization methods to improve the accuracy of disparity measurements.

From knowledge of the relative locations of two camera positions, the disparity vector between two pixels that correspond to images of an object point at the two camera positions is constrained to a line referred to as the epi-polar line constraint.

The prior art methods control camera position and orientation to recover depth information. Some of these methodologies compute image or optical flows from a sequence of images and use estimated flow fields to compute the depth. Other methodologies control both position and orientation of a camera so that an image point has zero flow in the different images, i.e., a fixed point. A fixed point is referred to as a point of fixation whose depth can be computed easily. Information about a scene in different images can be computed from fixed points and flow fields. It is also possible to perform fixation repeatedly to recover depth information for a given scene. Stereo vision is a specialized method of flow-based methodologies. Disparity vectors are image flows.

The most obvious approach to stereo matching uses correlation described in more detail in an article by Rafael C. Gonzalez and Paul Wintz, *Digital Image Processing*, 2nd Ed. Addison Wesley, New York, 1987. This approach compares the correlation between intensities of points in two image-patches. The image patch that has the highest cross correlation with the given patch is chosen as the corresponding patch of the given one.

This approach suffers from some of the draw-backs of traditional stereo vision described in an article by S.T. Barnard, *Stochastic stereo matching over scale*, International Journal of Computer Vision, 3:17–32, 1989.

The drawbacks include:

1. The size of the patches affects the likelihood of a false match. The given patch must be large enough to differentiate this patch from others.
2. The patch must be small compared to the variation in the disparity map. If the patch is too large the correlation will be insensitive to significant abrupt changes in the image (such as those pixels corresponding to edges of the object). This problem has motivated the use of coarse-to-fine stereo-matching.
3. The correlation is not a reliable matching mechanism if the viewed area consists of uniform or slowly varying intensity.

A second approach is to match information-rich points, called features which are usually discrete. The stereo-matching process establishes the correspondence between two discrete sets of features. This approach has the following draw-backs (see the Barnard article noted above).

1. Some false matches are likely to happen at areas containing many features.
2. The error of the feature location in image coordinates must be smaller than the error of its disparity to locate 3D features accurately.
3. This approach provides sparse matching only.

A third approach decomposes each image into a pyramid of patches. Coarse stereo matching is performed on large patches first as discussed in an article by Umesh R. Dhond and J.K. Aggarwal, "Structure from Stereo—A Review", *IEEE Transactions on Systems, Man, and Cybernetics*, Vol. 19, No. 6, November/December, 1989, pp. 1489–1510. The course disparity is used to guide the match of smaller patches across images. This approach has some computational advantages and can ameliorate a false-target problem. The scale space must be well-chosen such that the coarse disparity is a good boundary of the fine disparity. Automatically selecting such a scale-space is difficult.

Another approach is to map the stereo matching problem to an optimization problem discussed in articles by T. Poggio, V. Torre, and C. Koch, *Computational Vision and Regularization Theory*, Nature, 317: 314–319, 1985 and A. Witkin, D. Terzopoulis, and M. Kass, *Signal matching through scale space*, International Journal of Computer Vision, 1:133–144, 1987. This approach represents tile mismatch between pixels of each pair and the variation of the disparity field by a potential energy. The stereo matching is solved by finding corresponding pixels such that the total potential of the disparity field will be minimum. Such methods are usually expensive in computation. Good initial values need be given if the optimization problem is non-linear. The potential functions used in this approach frequently have parameters relevant to the type of surface. However, the goal is to determine the characterization of the object surface when no knowledge about the surface is available. The definition of a potential function cannot be given if there is no prior knowledge. This approach causes some problems in computer vision. Another problem with this approach is due to the nature of the sensory device, typically a CCD camera, which provides discrete data. The model used, in contrast, usually is expressed in a continuous form. The discrete approximation of the continuous form introduces errors in computing the solution. The methods mentioned above are solutions having trade-offs between efficiency and the c/quality of matching.

They are all vulnerable in certain conditions. There are two main causes of the problems: (1) Too few constraints are available to guide the stereo matching; and (2) images are taken in different imaging geometries and many events could confuse the matching.

SUMMARY OF THE INVENTION

The present invention solves the problems by two approaches. First, more constraints are introduced independent of the viewed objects. The imaging means displacements, i.e., camera movements, are controlled in such a manner that fewer events are possible at the beginning of the procedure when less information about the object is known. The imaging means is then moved more efficiently after more information about the object is determined. The relation between the displacement and the disparity is employed to predict a new disparity field between the current image and the image acquired at the new imaging position. In the newly acquired image, a window containing the corresponding pixel of a given pixel in the current image prior to displacement is then predicted in terms of a current pixel, the predicted disparity, and the range of error of a subsequent estimated disparity. The correspondence problem is then solved by searching for the matched pixel in the predicted window for each pixel. The size of the window containing the corresponding pixel increases when the distance between the two adjacent imaging positions increases. However, the estimated disparity becomes more accurate when the corresponding imaging displacement becomes larger. Thus, there is a compromise between the efficiency and the accuracy in solving the correspondence problem because of the increased window size which tends to negatively affect the accuracy of determining correspondence and estimating disparities whose accuracy for depth estimation improves with window size. The present invention provides means and a method to control imaging displacements to obtain accurate depth values from the object to the imaging means efficiently.

It is assumed that discretization of an image located at coordinates (u,v) will map the projection of an object point to a pixel within a half pixel distance which leads to an error of ±1 pixel. It is further assumed that stereo-matching always finds the corresponding pixel correctly. Though this assumption is not always true unless an accurate stereo-matching method is used, failure of stereo matching can be detected and a simple stereo-matching method then applied to obtain acceptable results.

An apparatus in accordance with one embodiment of the present invention for estimating the distance of an object from a video image comprising an array of pixels comprises imaging means having an image plane for creating in the image plane at a plurality of successive imaging positions a corresponding plurality of video images of a given region of the object having a given distance in a given direction from the image plane. Each image of the plurality of images has at least one corresponding pixel manifesting the region. Means predict the location of a pixel window of a predetermined magnitude at each successive position in which the at least one pixel manifesting the region is positioned. Means estimate the value of the disparity of the at least one pixel in each predicted window. The disparity corresponds to the difference in position of the at least one pixel in each successive image of the plurality of images as compared to the position of the at least one pixel in the next preceding image. Means determine the value of the given distance from the value of the last estimated disparity,

BRIEF DESCRIPTION OF THE DRAWING

FIGS. 3–7 are diagrams useful for explaining certain principles of the present invention;

DESCRIPTION OF THE PREFERRED EMBODIMENT

Figure 1:
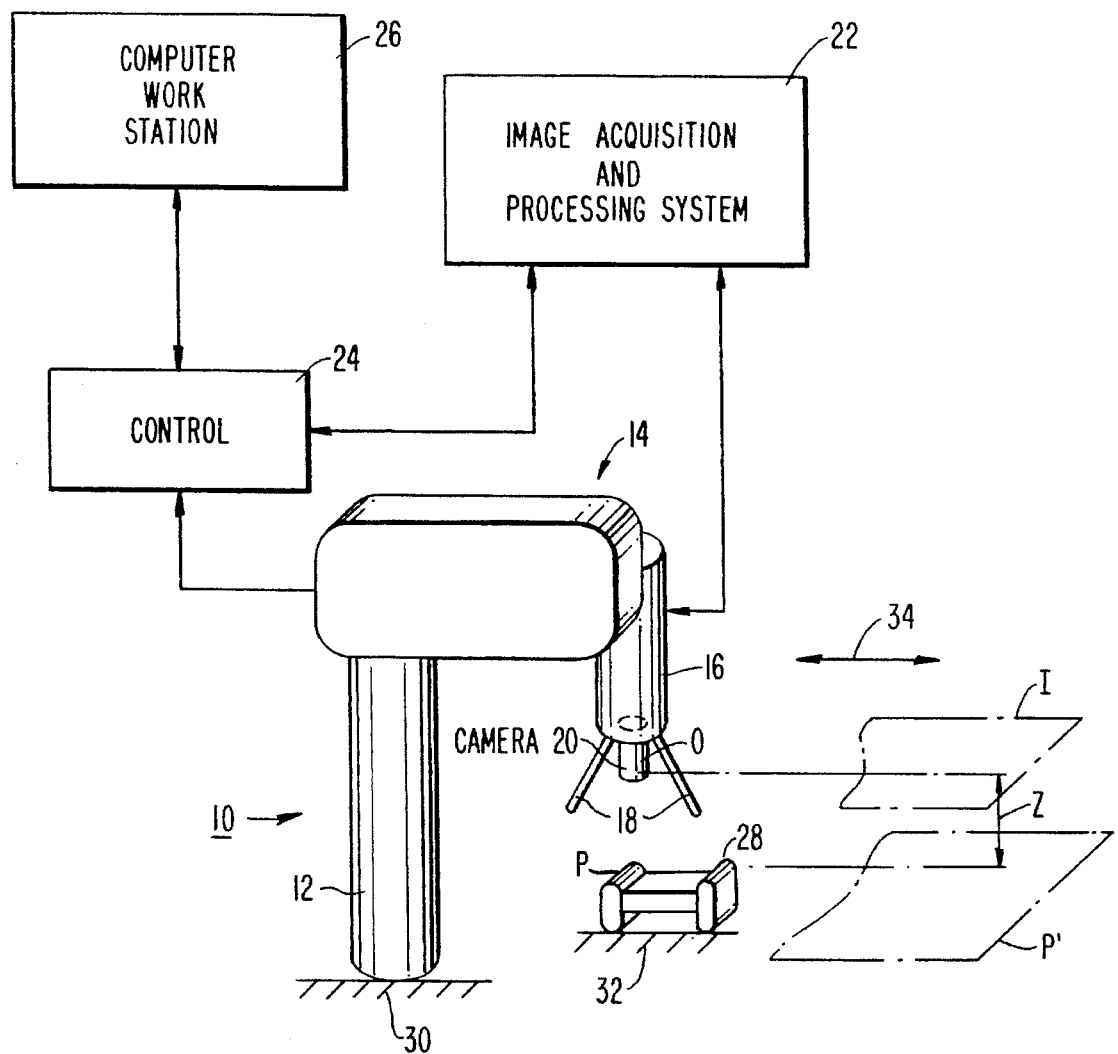
FIG. 1 is an isometric view of an apparatus including a circuit block diagram for operating the apparatus in accordance with one embodiment of the present invention.

In FIG. 1, robot 10 comprises a pedestal 12 and a mechanism 14 including an arm 16 and fingers 18. Robot 10 may be of the type manufactured by the Puma Corporation by way of example. Arm 16 has 6 degrees of freedom. Robot 10 includes internally operated computer programs including an interpreter which accepts commands specifying robot movements in cartesian coordinates. A charge coupled device (CCD) video camera 20 is secured to and in fixed spaced relation to the extended end of arm 16 adjacent to the fingers 18. In the alternative, camera 20 may be attached to a separate robot system operated in conjunction with the system of FIG. 1 for the purpose of imaging an object. In this case the coordinate position of the camera relative to the system of FIG. 1 is known so that the system of FIG. 1 can process that image for purposes to be explained.

Figure 2:
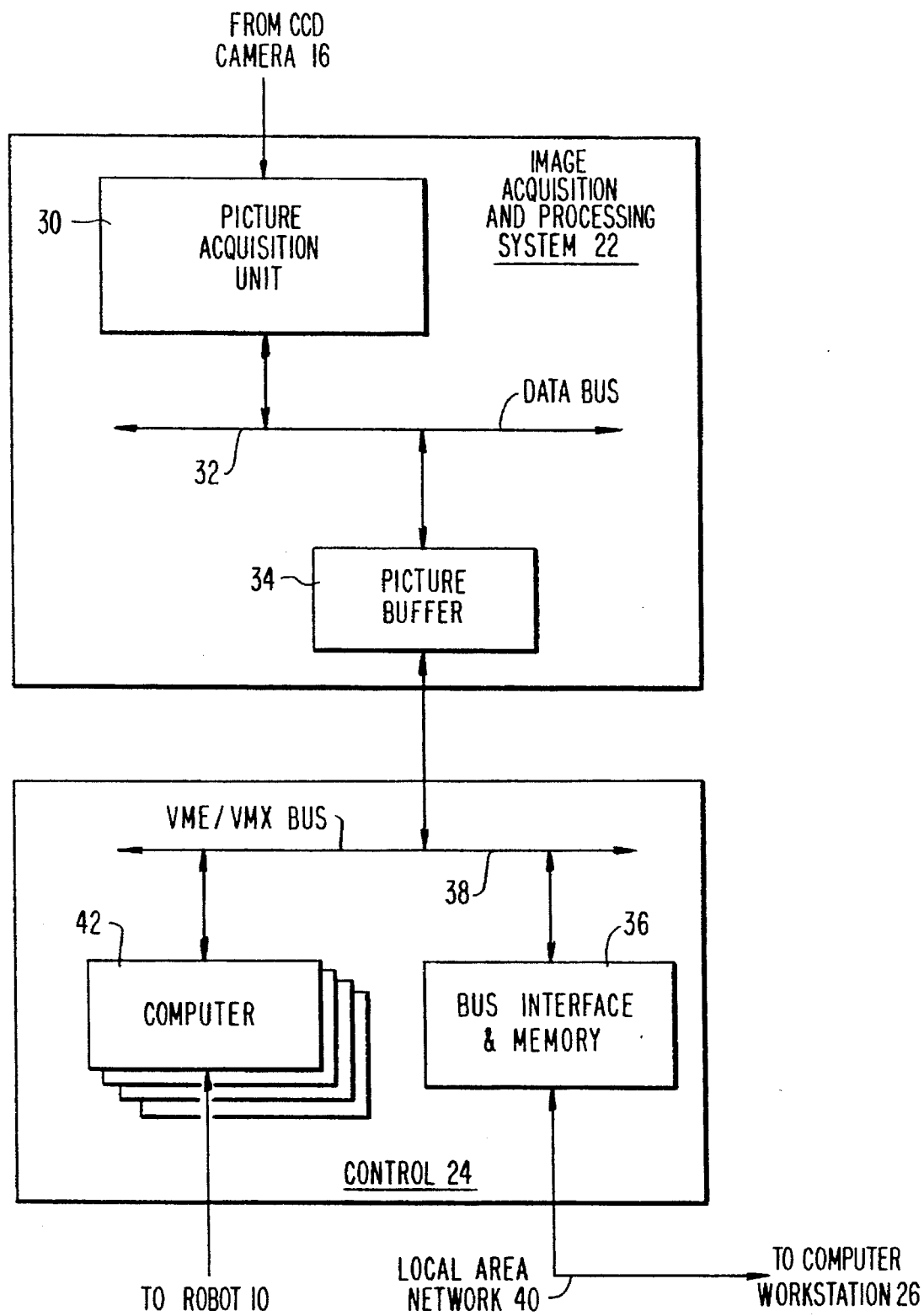
FIG. 2 is a more detailed block diagram of the circuit of FIG. 1.

In FIGS. 1 and 2, an image acquisition and processing system 22 processes the images produced by the camera 20. System 22 acquires the images via picture acquisition unit 30 and may also include a display (not shown) for displaying the images where desired. The unit 30 applies the acquired digitized image to picture buffer 34 via data bus 32. The buffer 34 stores the image for subsequent utilization. The buffered image is applied to control 24 bus interface and memory 36 via VME/VMX bus 38. Interface and memory 36 transmits the image from the buffer 34 to a local area network (LAN) 40 to computer work station 26 via a hard disc drive (not shown) for later processing by the workstation 26. The image acquisition and processing system 22 is commercially available.

Control 24 contains a plurality of signal processors in the form of separate circuit board computers 42 each of which can receive and run a corresponding different computer program from the workstation 26 in accordance with a given assigned task. One of the computers 42 transfers commands from the workstation 26 to control the positioning of the robotic mechanism 14 including arm 16 and fingers 18 and for operating the image acquisition and processing system 22 via bus 38. Bus interface and memory 36 transfers images from buffer 34 via bus 38 to the workstation 26 via LAN 40 for further storage and/or processing. Workstation 26 is commercially available, for example, as manufactured by Sun Corporation, Sun model 360. The workstation performs a number of tasks including operating the robot 10, storing images, computing the three dimensional structure of an object 28 to be grasped by the fingers 18, performing calculations to determine predicted window locations of corresponding pixels at different camera positions and estimating disparity as explained below. The workstation is programmed to access images stored in the LAN hard disks and compute the next camera position for acquiring the next image in a sequence. It also computes a new robot position based on the kinematics of the robot and the determined next camera position. A user gives a command to the workstation which command is then transmitted to a corresponding computer 42 which then communicates with and controls the robot 10. The interpreter in the robot receives the command and responds accordingly.

In FIG. 1, pedestal 12 of the robot 10 is supported on either a fixed support or a movable support as represented by symbol 30 in accordance with a given implementation. The object 28 is supported on a support structure represented by symbol 32. The support structure, symbol 32, may either be fixed or movable. For example, the object 28 may be on a conveyor. The object 28 has an object point P. The object point P lies in an object plane P'. Point P is of relatively high contrast with neighboring points. The camera 20 secured to arm 16 has a center of projection 0. In other implementations, the camera may be supported by a separate, different robot (not shown). The camera 20 optics has an image plane I on which the image is projected.

Workstation 26 on command from a user via control 24 via one of the computers 42 operates the camera 20 via the robot 10 so as to cause the camera 20 to image in the image plane I the object point P. The object point P is preferably one having good imaging features such as a curved surface or other feature rich surface which has good contrast and which can be observed as a point.

The control of a robot to grasp an object is used to illustrate one implementation of the present invention. In order for the robot 10 fingers 18 to acquire and grasp the object 28, the system must accurately know the distance between the fingers 18 at a given robot position and the object 28. Therefore, it is initially a requirement of the system to acquire the depth information between the robot arm 16, fingers 18 and the object 28. This depth, distance Z, must be acquired for the system to understand how far to move the arm 16 toward the object 28 for the purpose of manipulating the fingers 18 and grasping the object. For purposes of explanation, the object 28 is assumed stationary for determining distance Z. In the other implementation discussed above where the camera is secured to a second separate different robot, the second robot is used to grab or otherwise process the object 28. In this other implementation, the workstation determines the distance Z between that camera position and the object 28. Workstation 26 via control 24 in that kind of system implementation therefore includes appropriate computer programs and computation capability for analyzing the coordinate position of the camera relative to the two robots for grasping or manipulating the object 28. To do this is within the skill of one of ordinary skill in the art. However, for purpose of illustration the camera 20 is assumed attached to the arm 16 to which the fingers 18 for grasping the object are also attached for simplifying explanation.

The problem is to accurately and repeatedly compute the distance Z between the camera 20 and the object 28 without knowing in advance their relative positions. The present invention displaces the camera 20 in a controlled manner to compute window positions in each next acquired image at each position in which window it is known that a corresponding pixel must exist. An estimated disparity is then computed for each window. From that computed disparity by implementing stereo matching as known in the art the correct accurate disparity value for the finally acquired image is then computed. Once that disparity is estimated it is then a manner of known computation relationships for computing the value of the depth between the camera 20 and the object 28 distance Z. As will be shown, the distance Z can be estimated to a high degree of accuracy employing the apparatus and methodology of the present invention. The following discussion will explain the principles on which the present invention is based employing a single camera as shown in FIG. 1 or, in the alternative in accordance with other implementations, employing multiple cameras in a simple way for providing an accurate estimation of the value of the distance Z between the camera and the object 28.

The imaging geometry of stereo vision can be defined as shown in FIG. 3 using the right coordinate system. A pin-hole model is used to describe the imaging geometry of each camera. In addition, it is assumed that both cameras have the same imaging geometry. While two cameras 1 and 2 are shown, it is to be understood that these in practice refer to two camera positions of a single camera having an initial position and a second position to which the camera is displaced. In FIG. 1, the camera 20 is at the initial position of camera 1, FIG. 3, and is then displaced to the right in directions 34 in a plane parallel to the image plane I to the position of camera 2, FIG. 3. The distance Z between the image plane I of the two camera positions and the plane P' containing the object point P is constant. The two camera positions are spaced distance D. Points $0_1$ and $0_2$ represent the center of projection of the two cameras, respectively.

The pin-hole model defines the image formation as perspective projections from object points onto the image plane I. The center of the camera is referred to as the camera position unless ambiguity occurs. An object point P of relatively high contrast with neighboring points is projected onto a camera pixel via a projection line $P_{11}$ from object point P to the center $0_l$ of camera 1. The object point P is projected onto the pixel $x_1$ in the image corresponding to the intersection of its projection line $P_{11}$ and the image plane I when an image is formed. The coordinate of each pixel x is specified in terms of the coordinate frame with its origin at the center of the camera. The disparity d of the object point P between the position of camera 1 and position of camera 2 is the difference between the image coordinates of the two intersecting points $x_1$ and $x_2$. The image coordinate frames are different when different images are used. That is, different camera systems produce different images and the image coordinate frames therefore will correspond to a given camera system. The values of disparity d and the camera displacement D have opposite signs. Thus, the distance between the two pixels $x_1$ and $x_2$ is D+d where disparity d is a negative value and distance D is always greater than D+d.

In FIG. 3, (D+d)/D=(Z−f)/Z where D is the distance between the two cameras, f is the distance from the image plane I to the center of the camera $O_1,O_2$ and d is the disparity. The distance Z between the object point P and the camera centers $O_1$, $O_2$ is computed by equation 1.

$$Z = \frac{-Df}{d} \qquad (1)$$

It is assumed in FIG. 3 and for all implementations that the camera at each camera position has the same focal length f which is always true using the same camera for all positions. However, where different cameras are employed it is important that the focal length f for all of the cameras when different have the same focal length f. A constraint has been derived by others from the geometry of imaging to aid stereo-matching referred to as the epipolar line. This is described in more detail in an article by R.C. Bolles et al entitled *Epipolar-plane image analysis: An approach to determine a structure from motion*, International Journal of Computer Vision, 1:7–55, 1987. This constraint is useful in that it reduces stereo-matching from a two dimension search problem to a one dimension search problem. This constraint is as follows.

In FIG. 4a, the epipolar-line constraint is applicable to images acquired by a camera at various camera positions assuming that the camera position and orientation at each imaging site are known. The center-of-projections of the camera at the two camera positions and the object point P defines the epipolar plane which contains the object point P and two center of projections $O_1$ and $O_2$. Camera 1 has an image plane $I_1$ and camera 2 has image plane $I_2$. The epipolar plane always intersects the two image planes $I_1$ and $I_2$. The intersections of these planes are two lines called epipolar lines $1_1$ and $1_2$, respectively. In the search for a pixel in image plane $I_1$ that corresponds to the pixel $u_1$, the corresponding pixel $u_2$ must lie on the epipolar line $l_2$. This is what is referred to as the epipolar-line constraint.

The epipolar-line constraint can be tightened for stereo vision. In this constraint, the camera is displaced a distance D in a direction X FIG. 3, normal to the depth Z direction to an object point P. Point P can be repetitively observed on the object at different camera displacement distances D in the X direction. This point may be, for example, an edge or other feature rich point of the object (high contrast between adjacent points). Two images from the two camera positions on image planes $I_1$ and $I_2$ are acquired by image acquisition and processing system 22, FIG. 1. The two cameras are separated by distance D, FIG. 2, but the two image planes $I_1$ and $I_2$ are coplanar on plane I. By choosing the coordinate frame carefully, FIG. 3, the two camera positions, for example, for a camera 20, FIG. 1, can be assumed to be spaced along the X-axis with a distance D between the two cameras and Z is the distance from the camera center $O_1$ or $O_2$ to point P. The two epipolar lines $1_1$ and $1_2$ of FIG. 4a reduce to a single line $1_3$, FIG. 3, parallel to the X-axis and lying in plane I. Theorem 1 results based on the geometry of FIG. 3.

Theorem 1:

If the disparity of an object point is d and the distance between the two cameras (with their image-planes coplanar) is D, then −1≦d/D≦0. Proof: Referring to FIG. 3, the line $1_3$ through two image points and the line $1_4$ through two spaced camera centers $O_1$ and $O_2$ are parallel. The length of the line segment between and through the two image-points $x_1$ and $x_2$ is D+d. By simple trigonometry, $$\frac{(D+d)}{D} = \frac{(Z-f)}{Z}.$$

In practice, Z≧f if the object point is visible. The relation (1+d/D)≧0 must always be true which relation is equivalent to d/D≧−1. Further, (Z−f)/Z≦1 since f≧0. Therefore, (1+d/D)≦1. That is, d/D≦0.

This theorem provides a constraint on stereo-matching which without additional information cannot be fully used in traditional stereo vision. The image plane I of a CCD camera is of limited size (usually about 1 centimeter square). The distance D between the two cameras is typically much greater than the image plane size. The constraint d/D≧−1 is of limited value since it implies the search should be made along the entire epipolar line of the other image for the pixel, e.g., $x_2$, corresponding to a given pixel, e.g., $X_1$, i.e., the search range is from 0 to −D. However, the constraint d/D≦0 indicates that the given pixel $x_1$ must move in a direction opposite to the direction of the camera movement to create the image at the next position. Therefore, if the camera is moved to the right, FIG. 3, distance D, the search for the corresponding pixel $x_2$ in that image plane at camera position 2 must be to the left of the pixel $x_1$ in the original image. Solving the correspondence problem still needs extensive search on about half of the epipolar line 13 on average. While this reduces the search distance for the pixel $x_2$ by one half, more precision is needed.

The above constraint is more effectively utilized when a sequence of images acquired by closely located cameras is analyzed. In this case, D is made smaller than the dimension of the image-pane and gives a good boundary on the epipolar line to guide the stereo-matching. That is, a small value of D using the above constraint results in a search distance on average of about one half of the length of the epipolar line. This line is made small by making D small, i.e., less than the length of the image plane of the camera in the X direction. In other words, the initial value of D for the first displacement of the camera from its initial position is made smaller than the dimension of the image plane and, therefore, even though the boundary of the search distances on average is one half the length of epipolar line, this line by definition is smaller than the dimension of the image plane.

When the camera movement distance D is made small, the intensity pattern around image points on two images corresponding to the same object point P will roughly remain constant. This implies that a correlation technique could be used for stereo-matching in such situations. This leads to the concept to reduce the distance D between the two camera positions at the onset of the search for the position of pixel $x_2$. In addition, there is an additional property that is useful for stereo-matching which is stated below as theorem 2.

Theorem 2:

If the disparity of an object point is d when the distance between the two camera positions is D, the disparity d will be magnified by a factor of n when the distance between the two cameras is enlarged by a factor of n. That is, d/D is constant.

Proof:

The depth Z of the object-point is estimated by z=Df/d where d is the disparity, and f is the focal length of the camera and is constant. As Z is constant by definition during the acquisition of the image sequence, D f/d must also be constant. Therefore, if D is enlarged by n times, d must also be magnified n times.

Theorem 2 is useful for predicting the location of a window of the corresponding point $x_2$ in the new image after the camera is moved distance D. An example of using this theorem will be explained below.

The relation between the accuracy of the disparity d, the accuracy of the estimated depth Z, and the camera displacement D is based on five observations given below. Stereo-matching typically is easily completed when the camera movement is small. However, even with small displacements, there is a problem caused by the characteristics of the camera. The pixel resolution of the image acquired by a camera is limited and is discrete because typical cameras acquire pixels in discrete locations. This results in a possible error in the pixel estimated position. Therefore some error may exist in the calculated disparity. However, there is a boundary on such error.

Observation 1:

The magnitude of the error for the estimated disparity d caused by discretization of images is no more than 1 pixel. This is because maximum camera pixel error is one half pixel by definition. The maximum error of the pixel position is plus or minus one half pixel and it is assumed no error will be introduced by stereo-matching and that maximum error in the calculated disparity is caused by the sum of maximum error of each pixel location due to discretization. Therefore, the maximum error of estimated disparity is plus or minus 1 pixel.

Observation 2:

The maximum relative error of the disparity estimation d is large when the camera movement is small.

Assume the disparity of an object point is d when camera movement is D. The range of d/D is between [−1,0] according to theorem 1. The value of estimated disparity d can have at most $\lceil D \rceil +1$ different values where the symbol $\lceil \ \rceil$ refers to ceiling values. For example, $\lceil 5.8 \rceil$ means 6. The maximum error of the disparity estimation d is 1. The maximum relative error of disparity is 1/d. Since d increases proportionally as D increases, the relative error of disparity decreases as D increases and vice versa. This implies that the depth estimation will be prone to large error if the camera movement is small.

Observation 3:

When the magnitude of the camera movement is D, the number of possible depth values of the depth estimation Z is $\lceil D \rceil +1$.

The depth Z is estimated by Z=−Df/d. The estimated disparity is discretized to an integer. When $\lceil D \rceil =N$, the possible values of disparities are 0, −1, ... −N. As the depth is computed by the equation Z=−Df/d, the depths of all point in the space are decomposed into N+1 connected ranges: that is (O,Df/N), (Df/N, Df/N−1), ... ,(Df, ∞). This means that points in the 3D space are decomposed into a finite number of equivalence classes according to their depth values. Thus, if camera movement is in a smaller range of distances D, the depth estimation is less certain since there are fewer equivalence classes.

Observation 4:

The effect on the error of the estimated depth Z caused by the error existing in the estimated disparity d is reduced when the magnitude of the actual disparity d increases.

Figure 5:
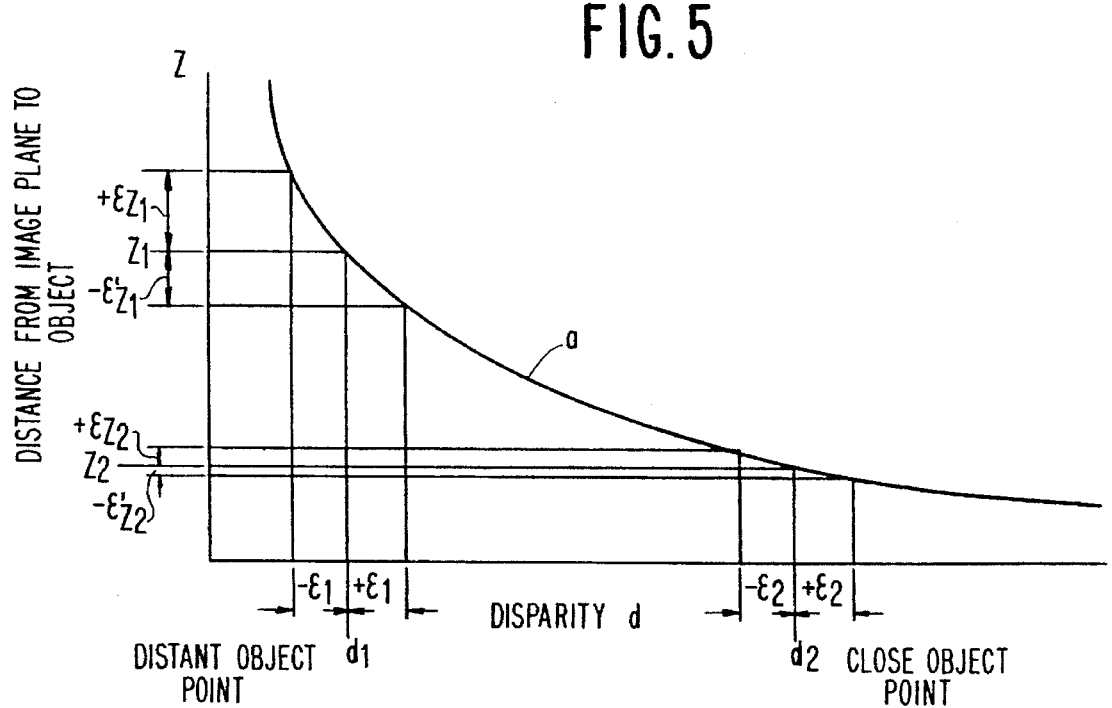

The expression for estimating depths is Z(d)=A/d where A is a constant. The error $\epsilon$ in d has the greatest effects on the accuracy of the estimated depth when the actual disparity d is small. Therefore, increasing the actual disparity improves the accuracy of the depth estimation using stereo vision. For example, in FIG. 5, curve a is a plot of the function Z (d)=A/d. When the error s of the disparity d is a constant, the error of the estimated depth distance Z from the camera center $O_1$, $O_2$ to the object point P (FIG. 2) increases as d decreases. In FIG. 5, $\epsilon_1=\epsilon_2$ which is the disparity error for the respective disparities $d_1$ and $d_2$.

Disparities $d_1$ and $d_2$ represent disparity values in a range of values from 0 to ∞. Recall disparity is the magnitude of displacement of an image point in response to camera movement. An image, however, comprises close up objects and distant objects. It is a fact that for a given camera displacement, a point representing a distant object (for example, at an infinite distance such as a star) does not appear to move or at best appears to move from image to image very small distances. In contrast, small camera movements produce relatively large displacements of a very close up object. Therefore, disparity has a large value for close up objects and a relatively small value for distant objects. In FIG. 5, the value of disparity for a pin-hole model can range from zero to ∞ where the disparity is zero for an object at ∞ and ∞ for a very close object.

The curve of FIG. 5 shows that the depth estimate Z has a greater error for small disparity values (such as estimating the depth to a distance object) than that for large disparity values of a closer object. The reason for this difference in depth estimation is that the depth estimation is derived from the disparity value according to the relationship of curve a of FIG. 5. The depth estimation $Z_1$ for disparity $d_1$ has an error range of $+\epsilon_{Z1}$ to $-\epsilon'_{Z1}$. In contrast, the depth estimation $Z_2$ for the disparity $d_2$ has an error range of $+\epsilon_{Z2}$ to $-\epsilon'_{Z2}$. The latter range is plainly considerably smaller than the former. That is, $Z(d_1+\epsilon) -Z(d_1)$ is larger than $Z(d_2+\epsilon) -Z(d_2)$ when $d_1<d_2$. As the disparity increases in magnitude further, it can be shown that increases in disparity value results in decreased error in depth Z estimation if the error in disparity is fixed.

Observation 5:

If the estimated disparity of a pixel is d and the error of disparity is within $[-\epsilon, +\epsilon]$, the region containing the real depth of the object-point is in the window range $[-Df/(d+\epsilon), -Df/(d-\epsilon)]$ if d is positive and $[-Df/(d-\epsilon), -Df/(d+\epsilon)]$ if d is negative.

The actual disparity d is within the range of $[d-\epsilon, d+\epsilon]$ when the estimated disparity is d and the actual disparity is positive. In the methodology herein it is assumed $\epsilon$ is one pixel. Since Z is positive using the coordinate system described in FIG. 3, if $d \leq 0$, then $-Df \geq 0$ according to equation 1. By substituting the two bounding values into equation 1, two estimated depth values results: $Z_{-\epsilon}=-Df/(d-\epsilon)$ and $Z_{+\epsilon}=-Df/(d+\epsilon)$. However, $Z_{-\epsilon} \geq Z \geq Z_{+\epsilon}$ in this coordinate system since $0 \geq d-\epsilon \geq d \geq d+\epsilon$. This verifies the case when d is positive. Similar verification can be applied to verify the depth range when d is negative except here Df is positive and $0 \geq -(d+\epsilon) \geq d \geq -(d-\epsilon)$. Therefore, the actual disparity value −1/d is positive and is within the estimated disparity window range $[-1/(d-\epsilon), -1/(d +\epsilon)]$.

Therefore, it can be shown that the difference between two bounding depths $Z\pm\epsilon$ over a disparity error range of $\pm\epsilon$ is: Range $(\epsilon_Z)=2|\epsilon Df|/(d^2-\epsilon^2)$. This value therefore decreases as the value of the disparity d increases as shown in FIG. 5. This means that the depth value Z can be estimated more precisely when d increases and the range of error in the estimated disparity d is fixed. When using stereo vision to determine depth from multiple images, the conclusion is that the images should be taken et two widely separated camera positions to obtain good depth values based on theorem 2. The above observations suggest that a large camera movement is desirable for obtaining improved accurate depth values using stereo-vision.

The observations made above are useful for creating a methodology for depth estimation. Some key steps of the methodology in addition to the methodology itself are explained below. Theorem 1 indicates that the magnitude of the actual disparity d of each image point x is within the range of camera displacement of a given value D. The corresponding pixel of a given pixel should be searched in a wider range as D increases. A reduced search range reduces the probability of ambiguity in the matching of pixels initially due to events such as occlusion and false matching. Therefore, relatively small camera moves should be made during the start-up stage because the stereo-matching at this time is more reliable.

Observations 2 and 3 state, however, that the accuracy of the depth estimation is poor even if the stereo-matching is performed correctly when the camera movement is small. Therefore, the strategy of the camera (or any other image sensor system) movement is to enlarge the camera (or sensor) movement as much as possible. This contradicts the step given above. The following analysis shows that a compromise is possible for obtaining a good depth estimation and avoiding difficulty in stereo matching. The concept to be introduced is that sensor, i.e., camera, movements can be organized in manner to implement efficient searching for the disparity value d.

Figure 6:
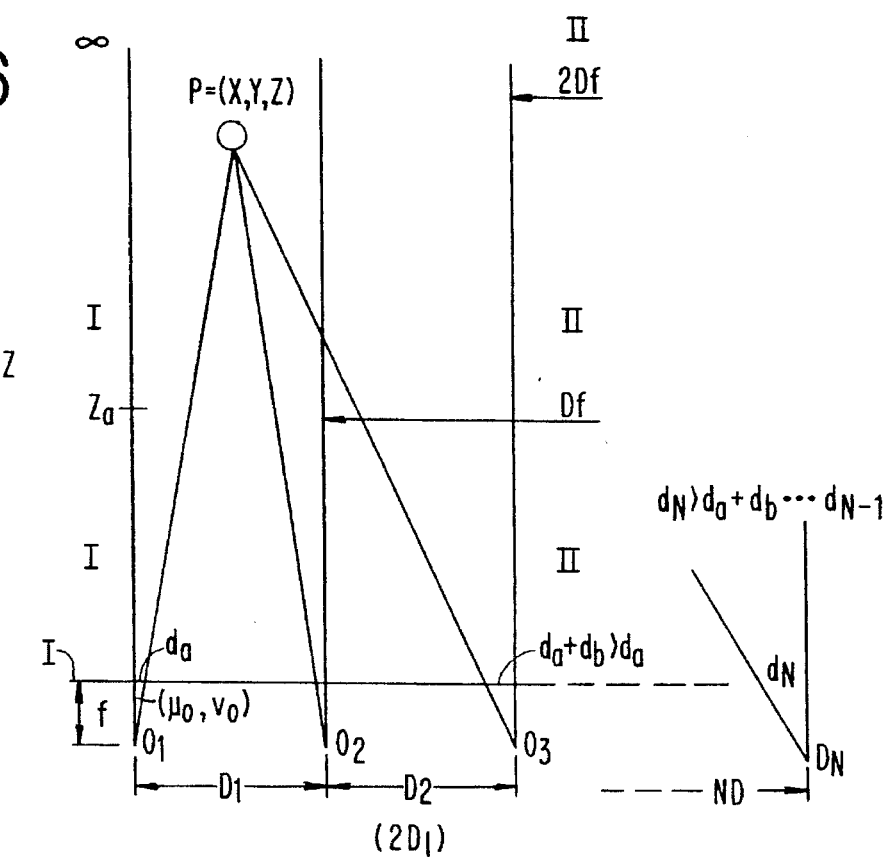

Let the disparity of an object point P be d when the total camera movement is 1 pixel. The possible values of d are either 0 or 1 due to possible pixel errors of ±½ pixel and the 1 pixel resolution of the imaging system. The ambient space containing the camera and the object is decomposed into two parts I shown in FIG. 6 according to observation 3 wherein D+1 for a one pixel displacement has a value 2. That is, there are two possible estimated depth values $Z_1$ (Df) or infinity per equation 1 based on the camera displacement $D_1$ of 1 pixel. The region in the curve from the image plane I to $Z_a$ has a disparity of zero. The ambient space is then further decomposed into three parts II if the camera is displaced an additional pixel distance $D_2$. According to theorem 2, the disparity of the object point P should be doubled after the camera movement is doubled. However, the stereo-matching after the camera is moved is recomputed, the absolute error |ε| on the disparity d after stereo-matching should be bounded by 1 pixel based on observation 1. Therefore, the disparity estimation d is more accurate as shown by FIG. 5 after displacement to point $O_3$ as compared with the previous estimation based on displacement to point $O_2$. The error ε of the estimated disparity d based on displacement to point $O_3$ has less effect on the depth estimation Z based on observation 4 (FIG. 5). The estimated Z thus will be more accurate than the previous estimation. The class of points $O_1$–$O_N$ will grow exponentially if the camera movement is repeatedly doubled. Therefore, to have N levels of depth values, $\log_2(N)$ movements are made. This provides a reliable methodology for generating the camera movement automatically.

Figure 7:
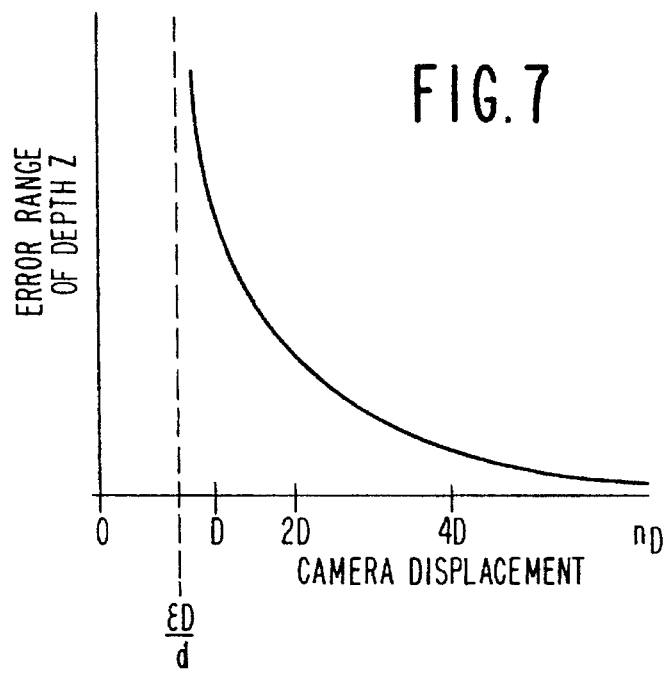

The actual depth Z of the object point P after stereo matching, i.e., finding corresponding image points in different successive images of an object, will be within a depth window range stated in observation 5 which is illustrated in FIG. 5. Each window is created for a corresponding displacement D where each distance D is doubled relative to the next previous displacement value. By equation 1 Z and f are fixed for a given object point (f fixed for a given camera).

$$\frac{d}{D} = \frac{f}{Z}$$

is constant. FIG. 7 is a plot of the relationship applicable to the object point whose depths are less than nDf. In reality, the point beyond nDf can be ignored for certain implementations. The depth window ranges for camera displacements at D, 2D, 4D . . . and ND are as shown in FIG. 7 for a given object point. This shows that the depth error range decreases as the camera displacement doubles.

To efficiently perform stereo matching for a given pixel in a current image, a window containing the corresponding pixel in the next occurring image at the next camera displacement position needs to be predicted. Consider a pixel at coordinates $(u_0, v_0)$, FIG. 6, in the first created image and assume that the camera movement to position $O_2$ is restricted to displacements along the X axis. The actual disparity d of an object point P at position $O_2$ is within the range of values $d_k-1$, $d_k+1$ where $d_k$ is the estimated disparity after moving the camera k times. Assume the total camera movement is $D_k$. If the camera movement is magnified by r times (that is, the total movement is $rD_k$), the actual disparity d after the new movement should be within the range $rd_k-r$, $rd_k+r$ (theorem 2). Thus, the stereo matching of the given point requires just the search for the corresponding point within the disparity window range from $(u_o+rd_k-r,v_o)$ to $(u_o+rd_k+r,v_o)$ and the size of the disparity window is 2r. A special case is r=2. The stereo-matching is performed within the disparity window region less than 2 pixels. This reduces significantly the effort needed in the traditional stereo-matching.

In summary, the initial predicted window to be searched for the corresponding pixel of a given pixel has a width D when the camera movement is D, theorem 1, and no prior stereo-matching has been performed. When the camera movement is magnified r times at each iteration (t), the predicted window has a width of 2r if the disparities were calculated previously. The accuracy of depth values are increased exponentially when the camera movement is magnified r times at each iteration.

To compute disparity estimation, a template matching technique is used as known in the literature as illustrated by Equation (2) and Equation (3). In FIG. 4b, given a pixel g located at coordinate (x,y) in image I1, to locate the corresponding pixel $g^1$ in image I2 in the region of an image (for example, a≦x'≦b, c≦y'≦d, where (x',y') is the coordinate of pixel $g^1$ in image I2, and a, b, c and d define a range of image coordinates) the following procedure is applied: For each of the pixels in the 3×3 matrix grid surrounding the pixel g, i.e, the pixels at coordinates (x,y), for each coordinate (x',y'), use the pixels in the 3×3 matrix grid surrounding $g^1$ (x',y'), and compute the similarity as described in Equation (2) and Equation (3). The pixel $g^1$ in image I2 with the maximal similarity is the one deemed to be the pixel corresponding to the pixel g at coordinate (x,y) of Image I1. Let (X*,Y*) be the coordinates of the pixel with the maximum similarity. By restricting camera displacement parallel to the X axis, Y*=Y. d is calculated by d=X*−X.

This technique employs the following expression in which the similarity of one pixel g defined by coordinates x,y in a first image $I_1$ to another pixel $g^1$ at coordinates x',y' in a second image $I_2$ is: similarity(x, y; x', y')

$$= \frac{\sum_{i,j=-1}^{1} (I_1(x+i,y+j) - m_1(x,y)) \cdot (I_2(x'+i,y'+j) - m_2(x',y'))}{\sigma_1(x,y)\sigma_2(x',y')} \quad (2)$$

$$m_i(x,y) = 1/9 \sum_{i,j=-1}^{1} I_i(x+i,y+j) \quad (3)$$

$$\sigma_i(x,y) = \left( 1/9 \sum_{i,j=1} (I_i(x+i,y+j) - m_i(x,y))^2 \right)^{0.5}$$

In summary:

I. Identify the pixels of interest in an image. Displace the camera distance D smaller than the image size to a first position. Compute the estimated disparity d for all pixels with the camera at the first displacement position D using the relations of FIG. 2 and equation 3. For a given value of the estimated disparity d, the value of the actual d is:

$$(d-\tfrac{1}{2}) \leq d \leq (d-\tfrac{1}{2}) \tag{4}$$

II. Move the camera to the next position distance rD where r is preferably 2. Acquire an image. A pixel corresponding to the pixel of interest for all pixels is expected to occur in this acquired image.

III. Predict the pixel window location for each pixel at this position at distance rD by multiplying equation 4 by factor r, e.g., 2.

$$2[(d-\tfrac{1}{2}) \leq d \leq (d+\tfrac{1}{2})] = (2d-1) \leq 2d \leq (2d+1) \tag{5}$$

where (2d−1) and (2d+1) defines the boundary of the actual disparity after camera displacement.

IV. Estimate the value of a new disparity d in the predicted window determined by equation 5 for each pixel using template matching of equations 2 and 3.

V. Predict the pixel window for each pixel at the next camera displacement position by multiplying equation (5) by factor r.

VI. Estimate the value of disparity d for each pixel in the predicted window and the corresponding window of step V using template matching of equations 2 and 3.

VII. Repeat steps V and VI until the desired accuracy of the desired estimated depth Z is obtainable.

VIII. Compute depth Z using the last obtained value of estimated disparity d for all pixels of interest, equation 1.

In general, using the above steps, the following relation holds:

$$d(t+1) = 2d(t) \tag{6}$$

where d(t) indicates the true disparity of a pixel at iteration t, and equation 6 is always true where the camera displacement to the next position is doubled from the value of the next previous displacement. In the method and apparatus of the present invention, the camera position for each iteration (t) is different. Hence, d(t) is read as the disparity of a pixel at the location of iteration t as well.

The pixel disparity is estimated using equation 5. For iterations (t), equation 4 is expressed as equation 7:

$$d(t) - \tfrac{1}{2} \leq d(t) \leq d(t) + \tfrac{1}{2} \tag{7}$$

For iterations (t) equation 5 is expressed as equation 8:

$$2d(t) - 1 \leq d(t+1) \leq 2d(t) + 1 \tag{8}$$

The steps shown in Table 1 below, in computer source code format, uses the method described above to recover depths with relatively high accuracy. The value of r is selected as described above. The value of N is the required disparity resolution, i.e., in pixels. D is the starting camera displacement magnitude. dp[i,j] is the disparity value found for the image point (i,j) in the array of points (i,j). EPIN (i,j,r) represents the image points around (i,j) which lie on the epipolar lines and with distances to (i,j) not greater than r. The term "move" means camera displacement. The depth Z is computed using the relation Z(i,j)=f* move/dp[i,j] where f is the focal length of the camera.

The method of Table I has the advantage in that the disparity d is estimated from the change of sensory information only. That is, the images are iteratively processed until the depth is computed. This procedure avoids lengthy computations and the error that can be introduced in computing depths and then back-projecting 3D points onto the image plane from the object based on the computed depths.

The method implemented in the code of Table I has the following advantages compared with the traditional stereo vision:

1. It is more efficient than the traditional method because the search for corresponding pixels is in a window of 2r pixels.
2. A parallel version of this method can be implemented easily since no complicated computation is used. (It uses convolution and division only.)
3. It can detect false stereo-matching by failing to find the corresponding pixel in the predicted window.
4. It can be used to recover depth maps for scenes containing various shapes of objects since it does not use object features.

TABLE I

Figure 8:
FIG. 8 is a partial view of a telephone receiver handset for illustrating certain principles of the present invention.
Figure 9:
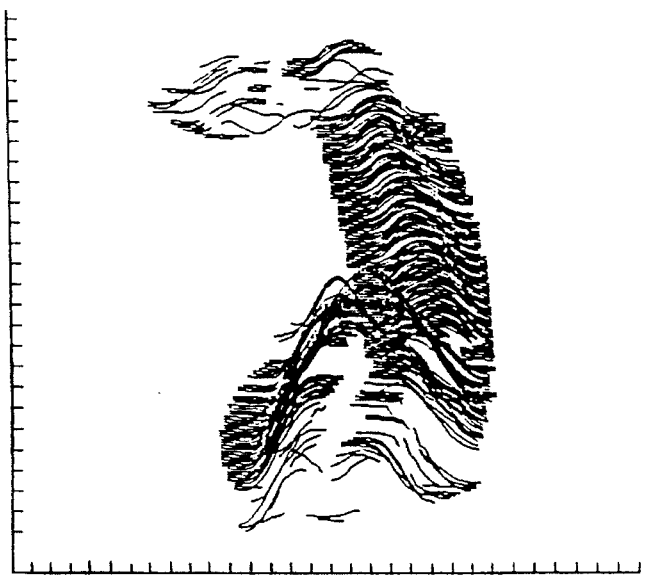
FIG. 9 is a diagram resulting from processing the signals produced by the object of FIG. 8 in accordance with the apparatus of FIG. 1.

Procedure Depth-recovery (D,r,N)
Begin
    dp[i,j] = 0 for all i,j.
    Get the left image L.
    move = D.
    Translate the camera to (move,0,0)/* This is an absolute
      movement */.
    Get the right image R.
    For all points (i,j)s in L do in parallel
      Find the best matched unage point in R within EPIN (i,j,D)
        using L(i,j) as template.
      Compute the disparity dp[i,j].
    endfor
    While (move ≦ N) do
      L = R. /* That is, using the right image as the new left
      image. */
      move = r * move.
      Translate the camera to (move,0,0) /* This is an absolute
        movement */.
      Get the right image R.
      For each point (i,j) in L do in parallel
        Find the best matched image point in R within EPIN
        (i+dp[i,j],j,r) using the image patch around L(i+
        dp[i,j],j) as the template.
        Compute the new disparity dp[i,j].
      endfor
    endwhile
    Compute the depth Z[i,j] for all (i,j).
end copyright 1991 North American Philips Corporation The method for finding matched image patches used by the algorithm described in table 1 was implemented by template matching, i.e., correlation between linear patches of two images. First, the depths for a horizontal slice of an image of a telephone handset were recovered. A sequence of images similar to FIG. 8 was acquired by moving a camera 0, 5, 15, 35, 75, 155, 315, 635, 1275 and 2555 pixels along the X axis (FIG. 2). One of these images is shown in FIG. 8 by way of example. A line with maximum intensity variation in the image is chosen. This choice minimizes the difficulty in stereo-matching. The cross in the image of FIG. 8 shows the location of a point on the horizontal slice being processed. The depth of each point on the slice is estimated after the sequence of images is acquired but the disparity of each point is refined during the image acquisition. The shape of the handset is recovered by running the program depicted in table 1. FIG. 9 shows a 3D plot of a depth map reconstructed from the so created images of the handset. For purposes of illustration, the shape of the handset is clearly seen in FIG. 9. The values shown in FIG. 9 are depths of the points relative to a support table under the handset. The actual maximum depth value is 0.060 m. The actual minimum depth value is 0.016 m. The maximum estimated depth is 0.05954 m while the minimum estimated depth is 0.02400 m. The range of error is within 1 centimeter.

Figure 10:
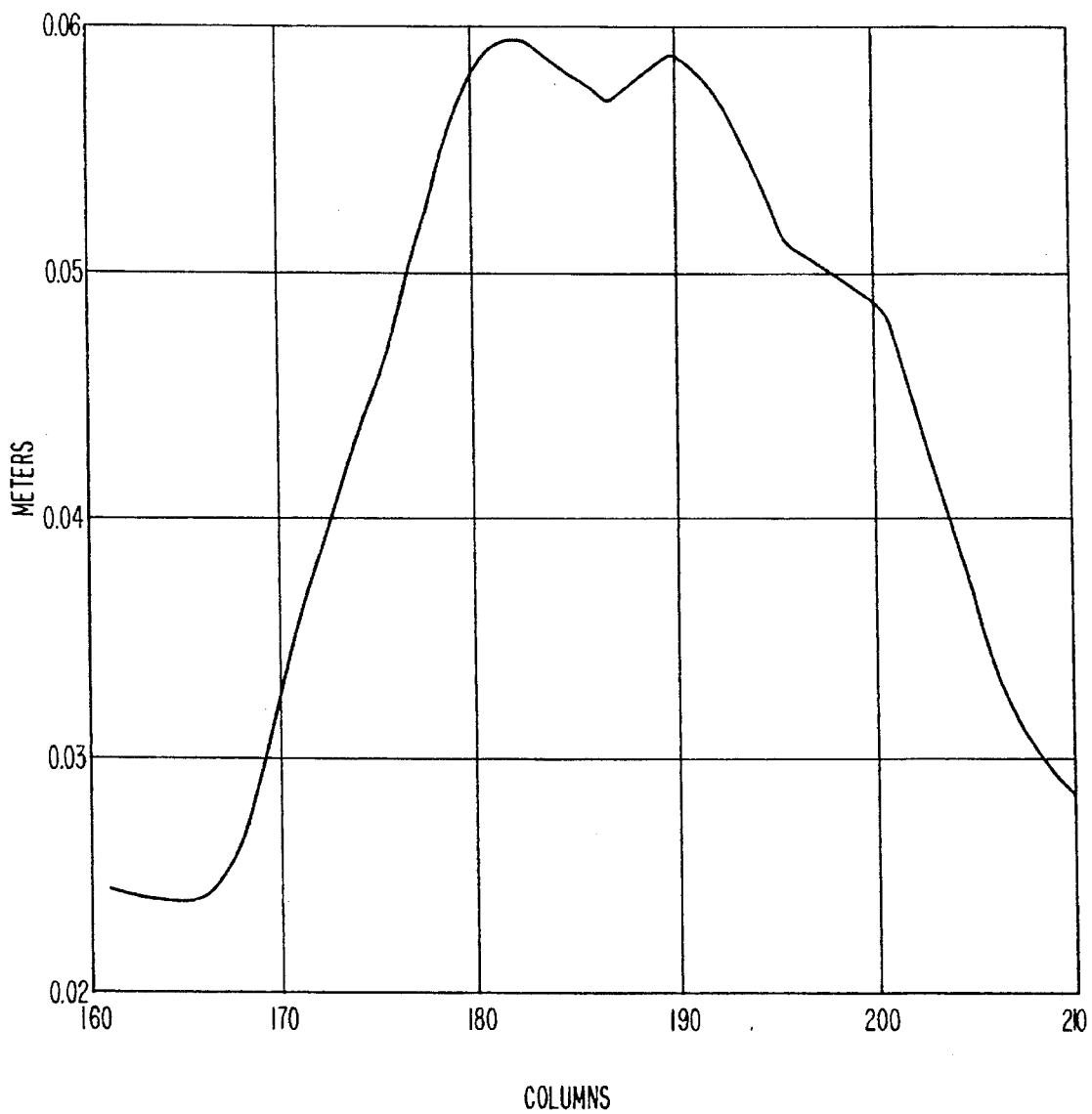
FIG. 10 is a sectional distance chart of the handset of FIG. 8 reconstructed by the apparatus and method according to the invention.

FIG. 10 shows the result of processing a slice of the image shown in FIG. 8. The plot shows the shape of the slice. The x-axis is the horizontal coordinate of each pixel. The y-axis is the depth value.

To compare performance of the method of table I with that of traditional stereo-vision algorithms, an algorithm was used with the same correlation routine for stereo-matching. Stereo matching by correlation, however, is not the best among existing algorithms. It is used here to provide a simple routine to provide a fair comparison between the two methods. The first and last images were used to recover a depth map employing the prior art algorithm. A three dimensional plot of the resulting image was noisy and could not produce a clean picture. The depth map did not match well with the actual depth especially at the handle portion of the handset. The points on the front face seemed further then the other points at the sides which is incorrect.

Depth recovery of the inventive apparatus and methodology was applied to scenes containing other objects including a tray having slots. Two images were made of the tray comprising the first and last of a sequence of images. The method of table I performed well although some noise was present. The depth recovery of this object is a difficult problem for traditional stereo techniques since the image area containing the slots varies as the camera is displaced, The three dimensional plot of the tray, recovered by the inventive method and apparatus, clearly revealed the shape of the tray.

As a result, when camera movements are chosen carefully, even with a simple stereo matching method, good estimation of depth can be achieved. There are many applications for this methodology including recovering the shape of a visible portion of an object, using the present method with a two dimensional object recognition algorithm in which the object is first recognized and then the depth is determined and, as pointed out previously, for grasping an object as shown in FIG. 1.

What is claimed is:

1. An apparatus for estimating the distance of an object from a video image comprising an array of pixels, said apparatus comprising:

imaging means having an image plane for acquiring in said image plane at a plurality of successive imaging positions, greater than two, a respective plurality of video images of a region of the object having a distance component in a given direction from said image plane, which distance component is to be determined, each image of said plurality of images having at least one pixel corresponding to a point on said object within said region;

means for automatically, without any action by an operator, predicting the location of a pixel window of a predetermined size in which said at least one pixel will be located in a next succeeding one of said plurality of video images;

means for estimating the value of the disparity of said at least one pixel in each pixel window, said disparity corresponding to the difference in position of said at least one pixel in a current image as compared to the position of said at least one pixel in an immediately preceding one of said plurality of images; and means for determining the value of said distance component from the value of a last estimated disparity.

2. The apparatus of claim 1 wherein said imaging means includes means for acquiring said video images in a manner that said successive imaging positions are spaced from immediately preceding imaging positions by respective relative distances, each relative distance being equal to an immediately preceding relative distance multiplied by a given factor.

3. The apparatus of claim 2 wherein said given factor is an integer.

4. The apparatus of claim 2 wherein said factor is greater than one.

5. The apparatus of claim 1 wherein said imaging means comprises a digital video camera and means for displacing said camera in a plane parallel to said image plane.

6. The apparatus of claim 1 wherein each said successive position is spaced from the next preceding position by a spacing value, said imaging means including means for causing each said spacing value to increase in magnitude by a factor of two from the next preceding spacing value.

7. The apparatus of claim 1 wherein said means for prediction includes means to predict the position of a pixel in a successive image corresponding to a pixel in a preceding image to be positioned in a pixel window according to the relation $nd(t)-1 \leq d(t+1) \leq nd(t)+1$ where $d(t)$ is the estimated disparity of the corresponding pixel at iteration t of the preceding image, n is a factor greater than one and $nd(t) \pm 1$ represents the limits of the prediction window in which a pixel at iteration t+1 occurs having an actual disparity value d.

8. The apparatus of claim 7 wherein $d(t+1)=2d(t)$ where the camera displacement is doubled in each iteration.

9. The apparatus of claim 1 wherein the disparity of a pixel of each successive image corresponding to a given pixel in the preceding image is given by the relation $d(t)-½ \leq d(t) \leq d(t)+½$ where $a(t)$ is the estimated disparity of a pixel at iteration t of an image and $d(t)$ is the actual disparity of a pixel at iteration t of that image.

10. The apparatus of claim 9 wherein said means for prediction includes means to predict the position of a pixel in a successive image corresponding to a pixel in a preceding image to be positioned in a pixel window according to the relation $nd(t)-1 \leq d(t+1) \leq nd(t)+1$ where d is the estimated disparity of the corresponding pixel at position t of the preceding image, n is a factor greater than one and $nd(t) \pm -1$ represents the limits of the prediction window in which a pixel of an image taken at the position of iteration t+1 has an actual disparity value d.

11. An apparatus for estimating the distance of an object from a video image comprising an array of pixels, said apparatus comprising:

first imaging means having an image plane for creating at a first imaging means position a first video image of a region of the object, said first imaging means position having a distance component in a given direction from said image plane, which distance component is to be determined;

second imaging means having a corresponding image plane for creating at a second imaging means position at a first distance value from the first position a second video image of said region, said second imaging means position having said distance component in said given direction from said corresponding image plane;

means for automatically, without any action by an operator, predicting the location of a pixel window of a determined size at said second position in which at least one pixel of the first image is predicted to be positioned, said at least one pixel corresponding to a point on said object within said region;

means for estimating the value of a disparity of said at least one pixel in said window, said disparity corresponding to the difference in position of said at least one pixel in said second image as compared to the position of said at least one pixel in said first video image;

means for causing said second imaging means to create successive images at successive positions, which successive positions are at respective first distance values, for causing said means for predicting and estimating to successively respectively predict the pixel window location of each successive position and estimate the disparity value of said at least one pixel for each successive position; and means for determining the value of said distance component from the value of the last estimated disparity.

12. A system for manipulating an object comprising:

a robot;

computer means for operating the robot;

imaging means coupled to the computer means for imaging said object, said imaging means having an image plane for creating at a plurality of imaging means positions, greater than two, a corresponding plurality of video images of a region of the object, said images each comprising a matrix of pixels, said region having a distance component to be determined, which distance component is in a given direction from said image plane; and distance determining means coupled to the computer means and imaging means for estimating the distance component and therefrom, the distance between said robot and object, said distance determining means including: means for placing imaging means at each said position for creating images of said object at each position such that all said image planes at said positions are coplanar, means for automatically, without any action by an operator, predicting a pixel window in each successively created image in which a given pixel of a preceding image is expected to occur and means for estimating a disparity of the given pixel in each said image, wherein the position of the imaging means at each successive position differs from the preceding position by a factor greater than one.

13. A method of estimating the distance of an object from a video image comprising an array of pixels, said method comprising:

acquiring in an image plane at a plurality, greater than two, of successive imaging positions a respective plurality of video images of a region of the object having a distance component in a given direction from said image plane, each image of said acquired plurality of images having at least one pixel corresponding to a point on the object within said region;

automatically, without any action by an operator, predicting the location of a pixel window of a predetermined magnitude in the image acquired at each of said successive positions in which said at least one pixel is located;

estimating the value of a disparity of said at least one pixel in each pixel window, said disparity corresponding to the difference in position of said at least one pixel in each successive image of said plurality of images as compared to the position of said at least one pixel in the immediately preceding image; and determining the value of said distance component from the value of the last estimated disparity.

14. The method of claim 13 wherein said acquiring includes acquiring said video images in a manner that said successive positions are spaced from the immediately preceding positions by respective relative distances, each relative distance being equal to an immediately preceding relative distance multiplied by a given factor.

15. The method of claim 14 wherein said factor is two.

16. An apparatus for grasping and manipulating an object using a video image comprising an array of pixels to estimate the distance of the object, said apparatus comprising:

imaging means having an image plane for acquiring in said image plane at a plurality of successive imaging positions, greater than two, a respective plurality of video images of a region of the object having a distance component in a given direction from said image plane, which distance component is to be determined, each image of said plurality of images comprising an array of pixels including at least one pixel corresponding to a point on said object within said region;

means for automatically, without any action by an operator, predicting the location of a pixel window of a predetermined size in which said at least one pixel will be located in a next succeeding one of said plurality of video images;

means for estimating the value of the disparity of said at least one pixel in each pixel window, said disparity corresponding to the difference in position of said at least one pixel in a current image as compared to the position of said at least one pixel in an immediately preceding one of said plurality of images;

means for determining the value of said distance component from the value of a last estimated disparity; and robot means constructed to grasp and manipulate said object; and control means responsive to said determined value of said distance component for causing said robot means to grasp said object.

17. The apparatus of claim 16, wherein said imaging means includes a camera secured to said robot means for creating said images, said robot means including means for displacing said camera to said successive imaging positions.

* * * * *